April 11, 1961 A. GUYENNON 2,979,349
SHAFT PACKING DEVICE
Filed Dec. 4, 1956 2 Sheets-Sheet 1
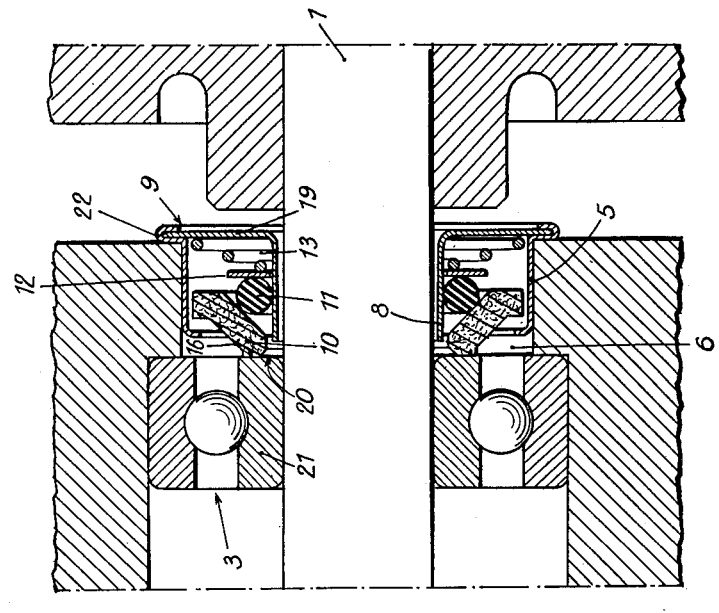
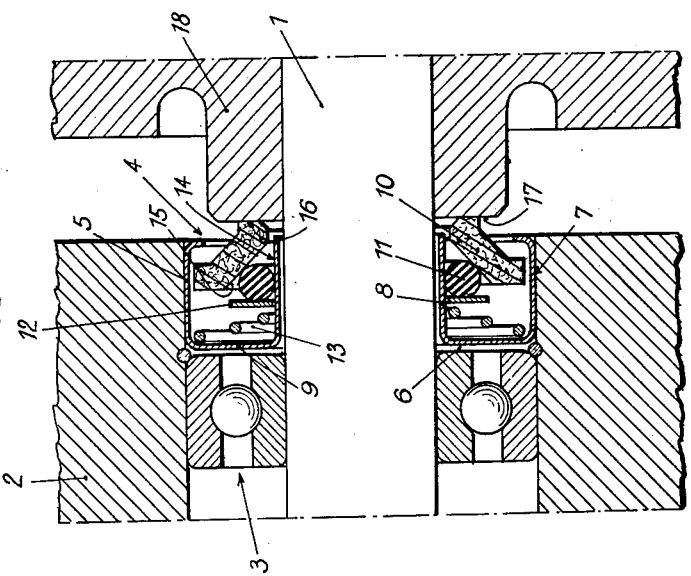

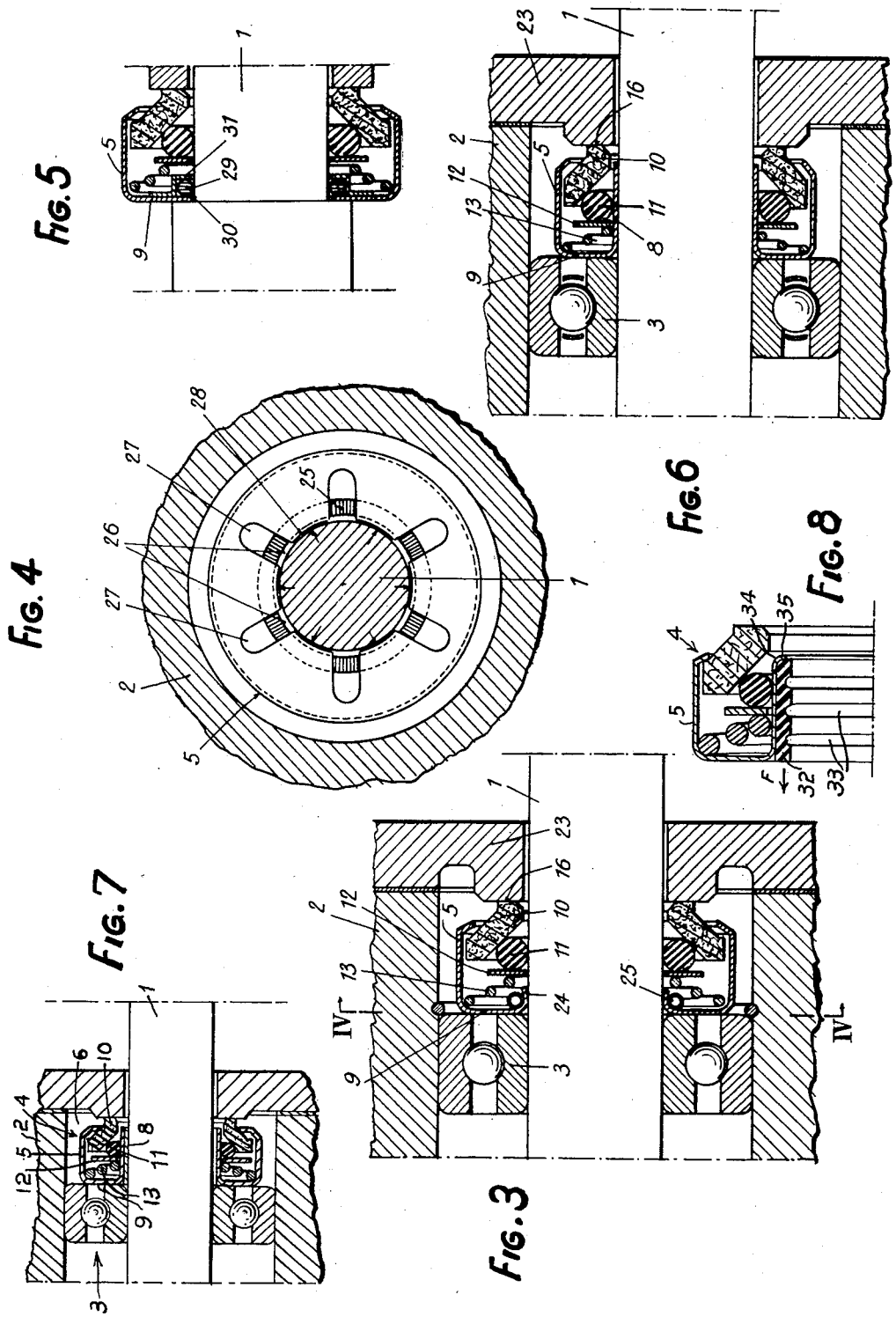

United States Patent Office 2,979,349
Patented Apr. 11, 1961

2,979,349

SHAFT PACKING DEVICE

André Guyennon, 22 Rue Ernest Michel,
Montpellier (Herault), France

Filed Dec. 4, 1956, Ser. No. 626,238

Claims priority, application France Jan. 10, 1956

2 Claims. (Cl. 286—11.15)

This invention relates in general to packings and more particularly to improved shaft packing devices of the type adapted to be fitted on rotary shafts and like mechanical parts.

Packings are already known which incorporate axial and radial sealing rings urged against each other and against their respective sealing surface by the action of spring means the aforesaid spring means and rings being mounted in a metal case or annular cup disposed coaxially around the machine shaft along which it is desired to prevent the leakage of a fluid.

In packings of the aforesaid type the axial sealing ring consists as a rule of a flexible ring of synthetic rubber, leather or other suitable material, mounted directly on, and rotatably driven from, the rotary shaft, although in some cases the flexible ring may be held stationary in relation to this shaft.

When the axial sealing ring is rotatably driven from the machine shaft it usually drives in turn by simple frictional contact the other elements of the device, including the metal case enclosing the assembly.

These different component elements of the sealing device are seldom positively driven and as a result slippages occur which are detrimental to the proper operation of the device and to the desired fluid tightness.

Now it is the essential object of this invention to provide an improved shaft packing of the aforesaid general type, whereby the inconveniences set forth hereinabove are avoided, notably as regards any relative movement between the different component elements thereof. This device is remarkable notably in that the case or like member is formed with a central annular portion rigid with or secured to the bottom of said case or like member and so disposed as to surround one portion of the outer surface of the shaft on which the packing is fitted, said central portion serving as a seat to one or more elements such as rings, springs or like component elements of the packing.

The aforesaid annular central portion of the case, according to one form of embodiment of the invention, may act as a seat either to a resilient member, for example a spring or the like, which is used to urge this portion of the case against the surface of the rotary shaft so as to ensure the desired rotation of the packing, or to the component elements of the packing, such as sealing rings or the like, and in this case the complete device is stationary whereas the shaft rotates freely inside the case in which the sealing action may be exerted, for example, in the axial direction.

From the foregoing it will be seen that whatever be the form of embodiment contemplated this invention provides means ensuring a safe and reliable fixation between the metal case and the various component elements enclosed therein, any relative movement or slippage of the sealing members with respect to each other or to the case being avoided completely.

Other features and advantages of this invention will appear as the following description proceeds with reference to the attached drawings forming part of this specification and illustrating diagrammatically by way of example a few typical embodiments of the invention.

In the drawings:

Fig. 1 shows in longitudinal section a sealing device or packing in which the different component elements are fixed relative to the rotary shaft on which the device or packing is fitted;

Fig. 2 is a longitudinal section showing a modified embodiment of the packing of Fig. 1;

Fig. 3 is an axial section showing another possible embodiment of the packing in which the component elements are adapted to be rotatably driven by the machine shaft on which the packing is fitted;

Fig. 4 is a section taken upon the line IV—IV of Fig. 3;

Fig. 5 is a part-elevational, part-sectional view showing a modified embodiment of the device shown in Fig. 3, Fig. 6 is a longitudinal section showing another modified embodiment of the device of Fig. 1;

Fig. 7 shows in longitudinal section the fitting of a packing device constructed according to a modified embodiment on a machine shaft; and Fig. 8 is a half longitudinal section showing in detail the packing of Fig. 7.

In the example shown in Fig. 1 of the drawings the machine shaft 1 is rotatably or pivotally mounted in a fixed part 2 of the machine, a suitable bearing 3 being interposed between the parts 1 and 2, as shown. Surrounding this shaft 1 and coaxial therewith is a packing 4 of which the different component elements are enclosed in a metal case, cup or like member 5 of substantially cylindrical shape. This case or like member 5 is pressed in a corresponding cavity or like recess 6 formed in the machine so as to lie in a predetermined angular position relative to the inner wall 7 of this cavity. This case is formed with an annular central portion 8 consisting of an intermediate portion of its bottom 9 which is flanged inwards and formed for example by die-stamping or otherwise pressing this button. The annular portion 8 extends substantially throughout the length of the case so as to constitute a cylindrical sleeve on which are threaded the radial sealing ring 10, the axial sealing ring 11, a thrust washer 12 and a compressing spring 13.

The sealing rings 10, 11 illustrated in the drawings are so designed that 11 is a toroidal ring for example of synthetic material, which is at least partly located in a frusto-conical recess formed in the radial sealing ring 10. Of course, this specific embodiment should not be construed as limiting the invention as any other adequate types of sealing rings may be contemplated in carrying out the packing of this invention.

The same applies to the spring 13 which bears against the bottom 9 of the case and urges on the one hand the sealing rings 10, 11 against each other and on the other hand these same rings 10, 11 against their corresponding sealing surfaces. These surfaces are for the ring 11 the outer face 14 of the central annular portion 8 of the case and the frusto-conical or tapered inner surface 15 of the ring 10, and the latter is formed with a radial annular portion 16 adapted to be engaged in a fluid-tight manner by the front surface 17 of a member 18 mounted on and rotatably driven from the rotary shaft 1.

The inner diameter of the central annular portion 8 of the case 5 is slightly larger than the diameter of the outer surface of the rotary shaft 1, so that this shaft may rotate freely in this annular portion.

From the foregoing it will be readily understood that during the operation of this assembly all the component elements of the packing are stationary, including the radial sealing ring 10 which is held in position by the other sealing ring 11 urged against the frusto-conical wall 15 of this ring 10 by the axial thrust of the spring 13.

The central annular portion 8 of the metal case 5, which acts as a seat to the various elements, such as sealing rings, springs and like elements of the packing, may also consist of a separate member independent of and secured on the case, for example by being secured on the bottom 9 thereof through any suitable means.

Thus, in the modified embodiment illustrated in Fig. 2 the annular central portion 8 of the case consists of a cylindrical sleeve expanding radially at one end and forming a flange or base plate 19 having its outer peripheral edge retained by the upset edge of the bottom 9 of case 5.

Of course, the base plate 19 may also be secured on the bottom 9 of the case or if desired on the lateral wall thereof through other means, for example by spot-welding.

The arrangement illustrated in Fig. 2 is the reverse of the one illustrated in Fig. 1 in that the radial sealing action is exerted inside the cavity in which the packing is fitted. In this case the radial portion 16 of the radial sealing ring 10 will engage the front surface 20 of the central race 21 of the bearing 3 so as to be in sealing engagement therewith.

In order to facilitate the removal of the case 5 from the cavity 6 when required the outer periphery and the bottom of this case 5 may be formed with a bead or like outer portion 22 forming a shoulder projecting somewhat from the cavity 6.

In the modified embodiment illustrated in Fig. 3 the sealing device instead of being stationary is rotatably driven from the shaft 1. In this case the axial sealing ring 11 is fitted directly on the outer surface of the shaft 1 so as to be in sealing engagement therewith and should normally drive for rotation by simple frictional contact the assembly comprising the radial sealing ring 10, washer 12, spring 13 and case 5. However, the radial sealing ring 10 coacting through its radial portion 16 with a fixed member 23 of the machine will somewhat counteract this driving action; similarly a certain amount of slippage will also develop in the case 5 driven by the spring 13 engaging the case bottom 9.

This slippage of the parts in relative frictional contact may be avoided by forming (see Fig. 4) on the case 5 a central annular portion 24 similar to the portion 8 already described. This annular portion 24 may consist for example of an internally flanged edge of the case which has a diameter substantially equal to the outer diameter of the machine shaft 1. A toroidal spring 25 is mounted on the annular edge 24 so as to resiliently press same against the surface of the shaft 1, and thus the case 5 will safely be driven for rotation.

In order to cause the aforesaid edge 24 to properly engage the outer surface of the shaft 1 a plurality of spaced axial notches or slots 26 may be formed in the annular edge 24 and radial notches 27 may also be formed in the bottom 9 of the case 5 so that the annular central portion 24 will be closed by a plurality of resilient blades 28 having a flexibility sufficient to resist the centripetal pressure exerted by the toroidal spring 25.

Fig. 5 illustrates another modified embodiment wherein the toroidal spring 25 is replaced by a resilient ring 29 for example of synthetic rubber or other suitable material; this ring 29 is located in a groove 30 formed between the bottom 9 of the case 5 and a ring-shaped element 31 secured on the bottom 9 and to which the same function as the central annular portions 24 or 8 of the preceding examples is devolved. In fact, the resilient ring 29 has such shape and diameter that it will adhere perfectly on the one hand to the walls limiting the groove 30 in which it is fitted and on the other hand to the outer surface of the shaft 1 so as to permit a tight mounting of the case 5 on this shaft 1.

Thus, it will be seen that also in this last example the case 5 is driven by the shaft 1 of the machine in a proper manner and without allowing any slippage to take place between this case and the sealing members enclosed therein.

Fig. 6 illustrates another possible embodiment of this invention wherein the central, sleeve-shaped portion 8 of the case is mounted without clearance on the machine shaft 1 so as to be rotatably driven therefrom together with the other parts of the packing. To improve the sealing action obtaining between the shaft 1 and sleeve 8 a layer of usual sealing material may be deposited between the interengaging surfaces of these parts.

In the modified embodiment illustrated in Figs. 7 and 8 of the drawings the annular portion 8 is mounted on the machine shaft 1 through the medium of a ring or sleeve 32 of deformable resilient material which is located inside and against the inner wall of this annular portion 8. This ring may be made of any suitable material for example a synthetic, plastic or other similar material, natural or synthetic rubber, etc. according to the specific applications contemplated.

This ring 32 is formed with internal recesses or cavities 33 for example of annular shape which are designed to increase the possibility of altering the shape of its wall when the case is forced on the machine shaft or like member to be sealed. Of course, the tolerance with which this sleeve 32 may be threaded on shafts having slightly different outer diameters is subordinate to the thickness of its wall, the depth of these recesses 33, the resiliency of the material of which it is made, etc. In all cases it must permit the fitting of the packing 4 on different machine shafts while preserving through its adherence on the outer surface of these shafts the perfect driving of the complete device when the shaft rotates.

Preferably, this ring 32 is cemented or otherwise sealed on the inner wall of the annular portion 8 of the case 5 by using for example a layer of a suitable adhesive 34.

The packing 4 is to be fitted on a machine shaft by moving the former axially in the direction of the arrow F; to this end it may be useful to provide at the opposite end of the central annular portion 8 of the case 5 a flanged edge 35 adapted to keep the resilient sleeve 32 in position in order to prevent it from slipping axially inside the annular portion 8.

This flanged edge 35 may be replaced, if desired or suitable, by projections or other suitable means provided on the inner wall of the annular portion 8.

Furthermore, it is also possible without departing from the spirit and scope of this invention to form the sleeve 32 in any other suitable shapes; the same also applies to the recesses or cavities 33 formed therein. Finally, this sleeve may have plain walls and be made of any other suitable material outside those mentioned hereinabove.

Of course, the different shapes given to the central annular portions 8, 24, 31 of the case, as described hereinabove, are also applicable to other sealing devices wherein the essential components have shapes differing from those illustrated herein. Moreover, this central annular portion may be provided externally of the case 5, that is, so as to project therefrom; this modification is particularly applicable to the embodiment shown in Fig. 3 of the drawings.

Of course, the invention is not limited to the few embodiments shown and described herein, as many modifications and alterations may be brought thereto without departing from the spirit and scope of the invention as set forth in the appended claims.

What I claim is:

1. A packing device for ensuring a fluid-tight connection between a shaft and a member rotatably mounted thereon and having an inner end surface, said shaft extending beyond said end surface; said packing device comprising a flexible and resilient collar, a rigid, hollow casing having an inner cylindrical wall fixedly mounted on said collar and substantially coextensive therewith, said casing also having an outer cylindrical wall of substantially the same length as said inner wall and an annular end wall connecting said inner and outer walls at one end thereof, the opposite end of said casing being open, said collar being adapted to be frictionally mounted on said shaft with the open end of said casing proximate to said end surface, a first toroidal, deformable seal member axially slidably mounted on said inner casing wall, a second ring-shaped seal member of hollow frusto-conical shape turnably received within said casing and having its end of smaller diameter extending out of the open end of said casing and adapted to slidably engage said end surface, said second seal member having a peripherally extending shoulder at its outer periphery spaced intermediate the ends thereof, said first seal member being located between said casing end wall and said second seal member and being at least partially located within said second seal member, spring means enclosed in said casing between said casing end wall and said first seal member for exerting an axial thrust on said first seal member against said second seal member, said outer cylindrical wall having an inturned annular peripheral flange at the open end of said casing which is located to engage the said shoulder of said second seal member to stop the axial movement thereof outwardly of said casing.

2. A packing device in accordance with claim 1, the inner surface of the wall of said collar being formed with axially spaced annular grooves, which enable said collar to yield and be flattened so as to fit perfectly on shafts having slightly different outer diameters.

References Cited in the file of this patent

UNITED STATES PATENTS

| | | |
|---|---|---|
| 2,149,975 | McCormack | Mar. 7, 1939 |
| 2,420,718 | Odelius | May 20, 1947 |
| 2,432,694 | Snyder | Dec. 16, 1947 |
| 2,561,132 | Payne | July 17, 1951 |
| 2,653,837 | Voytech | Sept. 29, 1953 |
| 2,760,794 | Hartranft | Aug. 28, 1956 |

FOREIGN PATENTS

| | | |
|---|---|---|
| 962,770 | France | Dec. 12, 1949 |